Jan. 28, 1941.  A. L. PARKER  2,229,931
VALVE
Filed July 22, 1938
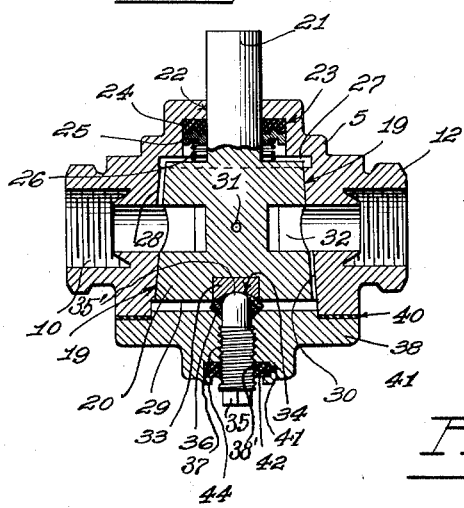
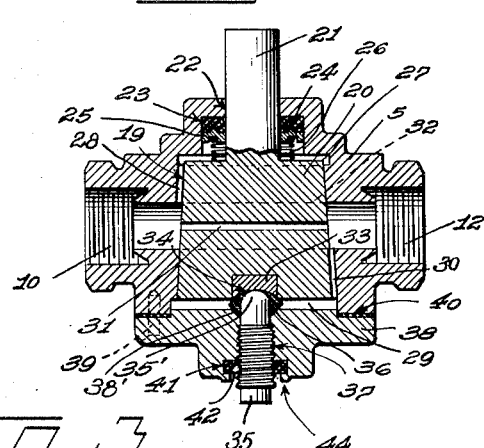
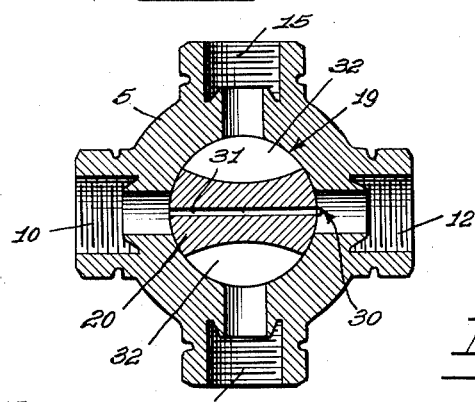
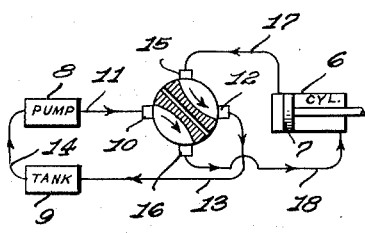
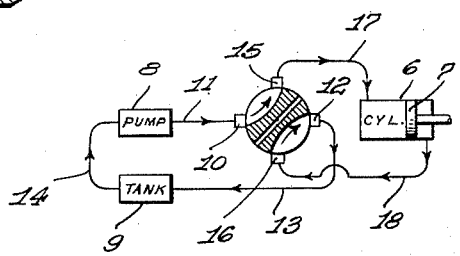
Inventor
Arthur L. Parker
By Mason & Porter
Attorneys Patented Jan. 28, 1941

2,229,931

UNITED STATES PATENT OFFICE 2,229,931

VALVE

Arthur L. Parker, Cleveland, Ohio

Application July 22, 1938, Serial No. 220,783

5 Claims. (Cl. 251—103)

The invention relates generally to valves intended for use in high pressure hydraulic circuits and primarily seeks to provide a novel valve structure including a tapered rotary plug and means for so mounting the plug as to provide for subjecting the plug to a controlled pressure tending to unseat the plug and effective to permit free rotation of the plug, despite the great line pressure to which it is subjected, and yet prevent leakage of fluid from the valve casing containing the plug.

Another object of the invention is to provide a valve including a casing, a tapered plug rotatably adjustable in the casing, means for directing fluid from the high pressure side of the valve to a point above the small end of the plug so as to tend to unseat the plug and permit free turning thereof, means for relieving pressure from the large end of the plug toward the low pressure side of the plug to prevent counteracting pressure build up, adjustable means for controlling the unseating effect of the pressure above the small end of the rotor and forming a rotary bearing for the plug, and novel means for preventing leakage from the valve casing.

Another object of the invention is to provide a novel casing seal or valve stem packing embodying a combination of spring and fluid pressure.

Another object of the invention is to provide a novel washer equipment serving as a lock nut and fluid sealings means for the plug bearing and unseating control screw.

Another object of the invention is to provide a novel by-pass arrangement in the valve plug.

With the above and other objects in view which will more fully appear, the nature of the invention will be more clearly understood by following the description, the appended claims, and the several views illustrated in the accompanying drawing.

In the drawing:

Figure 1 is a central vertical section of the valve.

Figure 2 is a central vertical section of the valve with the plug turned at right angles to the position thereof illustrated in Figure 1.

Figure 3 is a central horizontal section of the valve, the valve being shown in the off position.

Figure 4 is a detail cross section of the screw sealing and locking washer.

Figures 5 and 6 are diagrammatic horizontal sections illustrating the valve connected in a high pressure hydraulic system.

The improved valve includes a casing 5 and in this particular disclosure is a valve of the 4-way type adaptable to use in a high pressure hydraulic system such as might be employed in hydraulic presses. In such a system there is included a cylinder 6 having a piston 7 mounted for reciprocation therein, a pump 8 for applying hydraulic pressure alternately at opposite sides of the piston under control of the valve forming the subject matter of this application, and a tank 9 in which the pressure fluid is impounded.

The valve casing 5 includes a high pressure inlet 10, which may be connected by a line 11 with the pressure side of the pump, and a low pressure outlet 12 which may be connected by a line 13 with the tank, said tank being connected by a line 14 with the pump intake. The valve casing also includes outlets 15 and 16 which may be alternately connected through lines 17 and 18 with the respective ends of the cylinder for alternately directing fluid into said cylinder ends at the high pressure developed by the pump. The high pressure hydraulic circuit is diagrammatically illustrated in Figures 5 and 6 of the drawing.

The valve casing includes a tapered bore 19 in which a tapered valve plug 20 is rotatably adjustable, the stem 21 of the plug being extended from the small end of the plug through an opening 22 in the casing. Within the casing the stem opening 22 is surrounded by a counterbore 23 in which is mounted a packing ring 24 formed of any suitable yieldable composition material. The packing ring is opposed by a metal spreader ring 25, and a coil spring 26 is interposed between the small end of the plug and the ring 25 and serves to constantly urge the ring 25 into spreading engagement with the yieldable packing ring.

A pressure chamber 27 surrounds the small end of the plug, and communication is afforded between the chamber and the high pressure line within the high pressure inlet 10 by means of a communication duct 28 formed in the valve casing. A chamber 29 is provided beneath the large end of the plug, and this chamber communicates with the low pressure line through a communication duct 30 formed in the valve casing and communicating with the low pressure outlet 12 of the casing.

The valve plug is provided with a centrally disposed by-pass bore 31 and with side cutouts 32. The by-pass bore is provided for the purpose of preventing the building up of pressure between the pump and the valve inlet when the valve is in the off position, and the side cutouts serve the purpose usual in valves of the 4-way type, namely, of connecting pairs of the valve casing outlets 10, 15 and 12, 16 or 12, 15 and 10, 16 in the manner illustrated in Figures 5 and 6 of the drawing.

The plug is provided with a seat core 33 which is recessed in the large end thereof and includes a concave seat 34 for receiving the rounded end 35' of an adjustable bearing screw 35, said rounded end 35' being surrounded by a sealing washer 36 of yieldable composition material. The screw is threadably mounted as at 37 in a cap 38 which is secured as at 39 to the casing, a suitable gasket 40 being interposed between the cap and the casing. Cap 38 is cut away or bevelled at 38' about the screw 35 to better seat said sealing washer 36. The threaded bore in the cap is surrounded by a counterbore 41, and a washer 42 of suitable yieldable composition material surrounds the screw 35 within the counterbore. As will be observed by reference to Figure 4 of the drawing, the washer 42 has a normally non-threaded bore 43 engaged by the screw. In the assembly of the parts the screw is threaded through the bore of the washer, forming threads therein, and by this manner of mounting, the washer is made to serve the double purpose of a sealing ring and also a screw locking ring. The washer is secured in place in the counterbore by upsetting the metal of the cap as indicated at 44.

In this valve the high pressure of the fluid in the line 11 is communicated to the chamber 27 above the plug through the duct 28 so that there is a resultant downward pressure on the plug, while at the same time the duct 30 relieves the chamber 29 below the plug of any pressure which might have leaked past the plug into this chamber, thus making it impossible to build up counteracting pressure within the chamber 29. Consequently, the fluid pressure in the line 11 will exert only an unseating pressure on the plug. The plug, therefore, bears down upon the spherical end of the adjusting screw 35 and easily pivots about the screw and there can be no jamming of the plug against the valve casing.

The admission of high pressure fluid into the chamber 27 also reacts against the spreader ring 25 and augments the function of the spring 26 in tightly pressing the packing ring of synthetic rubber or other suitable yieldable material against the valve stem 21. This packing equipment requires no take-up or adjustment and the sealing of the stem against leakage becomes more effective as the pressure, and consequently the need for sealing, increases. The spring 26 serves to hold the packing parts in place when not under pressure and also contributes to the unseating pressure on the valve plug.

As previously stated, the composition washer 42 serves as a sealing means, and it so binds the adjusting screw that it also serves as a locking nut. This binding function is brought about by inserting the screw into the non-threaded bore of the washer and causing it to cut a thread in the washer. The sealing effect of the washer 42 is secondary to that of the washer 36 which engages the screw end and the adjacent plug and valve casing portions and provides the principal seal against leakage around the adjusting screw.

By reason of provision of the by-pass bore 31 in the plug the building up of pressure between the pump and the valve inlet is avoided when the valve is in off position as illustrated in Figure 3.

It is of course to be understood that the details of structure and arrangement of parts may be variously changed and modified without departing from the spirit and scope of my invention.

I claim:

1. In a valve, a casing having a plug chamber, a high pressure inlet and a low pressure outlet, a tapered plug rotatably adjustable in the plug chamber and having a stem projecting from its small end, said casing having a bore therein through which said stem projects and a counterbore surrounding the stem, a deformable gasket ring surrounding the stem in said counterbore, a spreader ring in said counterbore and having provision for spreading the gasket ring to seal the bore against leakage about the stem, spring means constantly pressing the spreader ring against the gasket ring and also tending to unseat and prevent hard turning of said plug, said plug being spaced from the casing at its small end to provide a pressure chamber communicating with the small plug end and with the spreader ring, a duct communicating between said high pressure inlet and said pressure chamber whereby fluid pressure will augment the tendency to unseat the plug and the pressure application to the spreader ring, and means preventing unseating of said plug.

2. In a valve, a casing having a plug chamber, a high pressure inlet and a low pressure outlet, a tapered plug rotatably adjustable in the plug chamber and spaced from the casing at its respective ends to provide a small end pressure chamber and a large end pressure relief chamber, side cutouts for controlling passage of fluid through the casing and respectively associated with the high pressure inlet and the low pressure outlet, a duct communicating between the pressure chamber and the high pressure inlet, a duct communicating between the relief chamber and the low pressure outlet and means preventing unseating of said plug by pressure exerted in the small end pressure chamber.

3. In a valve, a casing having a plug chamber, a high pressure inlet and a low pressure outlet, a tapered plug rotatably adjustable in the plug chamber and spaced from the casing at its respective ends to provide a small end pressure chamber and a large end pressure relief chamber, side cutouts for controlling passage of fluid through the casing and respectively associated with the high pressure inlet and the low pressure outlet, a duct communicating between the pressure chamber and the high pressure inlet, a duct communicating between the relief chamber and the low pressure outlet, a duct for communicating between the inlet and the outlet whenever the plug is in the closed position with the side cutouts therein turned out of communication with said inlet and outlet and means preventing unseating of said plug by pressure exerted in the small end pressure chamber.

4. In a valve wherein is provided a rotary plug and a casing having a chamber in which said plug is operable, said plug having a concavity at one end, a screw member threadably mounted in the casing and having a rounded head abutting the wall of said concavity to form an anti-friction bearing for the plug and prevent endwise movement thereof, the inner wall of said casing about said plug being cut away, and a sealing gasket surrounding the screw at the point of engagement with the plug and having sealing engagement with the plug at said concavity and the casing at said cut away portion.

5. In a valve wherein is provided a rotary plug and a casing having a chamber in which said plug is operable, said plug having a concavity at one end, a screw member threadably mounted in the casing and having a rounded head abutting the wall of said concavity to form an antifriction bearing for the plug and prevent endwise movement thereof, the inner wall of said casing about said plug being cut away, a sealing gasket surrounding the screw at the point of engagement with the plug and having sealing engagement with the plug at said concavity and the casing, said casing at said cut away portion having a counterbore surrounding said screw, and a screw sealing and locking washer in the counterbore and having an initially unthreaded screw receiving bore in which the screw is gripped by being forcibly threaded through said initially unthreaded bore.

ARTHUR L. PARKER.